United States Patent [19]
Von Kohorn

[11] Patent Number: 4,686,611
[45] Date of Patent: Aug. 11, 1987

[54] APPARATUS FOR ILLUMINATING CENTRIPETALLY VIEWED THREE-DIMENSIONAL OBJECTS

[76] Inventor: Henry Von Kohorn, 215 Rocky Rapids Rd., Stamford, Conn. 06903

[21] Appl. No.: 889,818

[22] Filed: Jul. 24, 1986

Related U.S. Application Data

[63] Continuation-in-part of Ser. No. 697,168, Feb. 1, 1985, Pat. No. 4,626,968, which is a continuation-in-part of Ser. No. 660,905, Oct. 15, 1984, Pat. No. 4,594,646, and a continuation-in-part of Ser. No. 733,936, May 14, 1985, Pat. No. 4,616,304.

[51] Int. Cl.⁴ ............................................. F21P 1/02
[52] U.S. Cl. ................................... 362/123; 362/805; 362/290
[58] Field of Search ............. 362/805, 290, 291, 292, 362/293, 154, 311, 296, 382, 354, 455, 456, 433, 434, 123, 153

[56] References Cited

U.S. PATENT DOCUMENTS

| | | | |
|---|---|---|---|
| 2,145,964 | 2/1939 | Bacica | 362/123 |
| 2,607,885 | 8/1952 | Pfister et al. | 362/292 |
| 3,162,367 | 12/1964 | Nowack | 362/806 |
| 3,885,150 | 5/1975 | Ott | 362/290 |
| 4,060,722 | 11/1977 | Foley | 362/123 |
| 4,349,864 | 9/1982 | Smith | 362/154 |
| 4,646,209 | 2/1987 | Jansen | 362/805 |

Primary Examiner—Craig R. Feinberg
Assistant Examiner—David A. Okonsky
Attorney, Agent, or Firm—Parmelee, Bollinger & Bramblett

[57] ABSTRACT

A substantially glare-free, directional lighting of three-dimensional objects is provided which artificial light is generated at a central point which is recessed, in close proximity to, and below the object to be illuminated. The light shines both directly upwardly, as well as downwardly against a reflective surface and then upwardly in the direction of such object in the shape of a predetermined light cone penetrating the underside of and substantially enveloping the object without significant scattering of light. A compartmentalized grille above the light source surrounds the lower end of the object and shields the eyes of observers from direct view of the light. The upwardly reflected light is centripetally and indirectly visible by its reflections from the illuminated object. The disclosed arrangement of components permits multi-directional centripetal viewing, and particularly the glare-free viewing by a plurality of juxtapositioned observers, for instance persons grouped around the illuminated object in a circle. A tree holder and illuminating apparatus having similar characteristics is disclosed.

29 Claims, 7 Drawing Figures

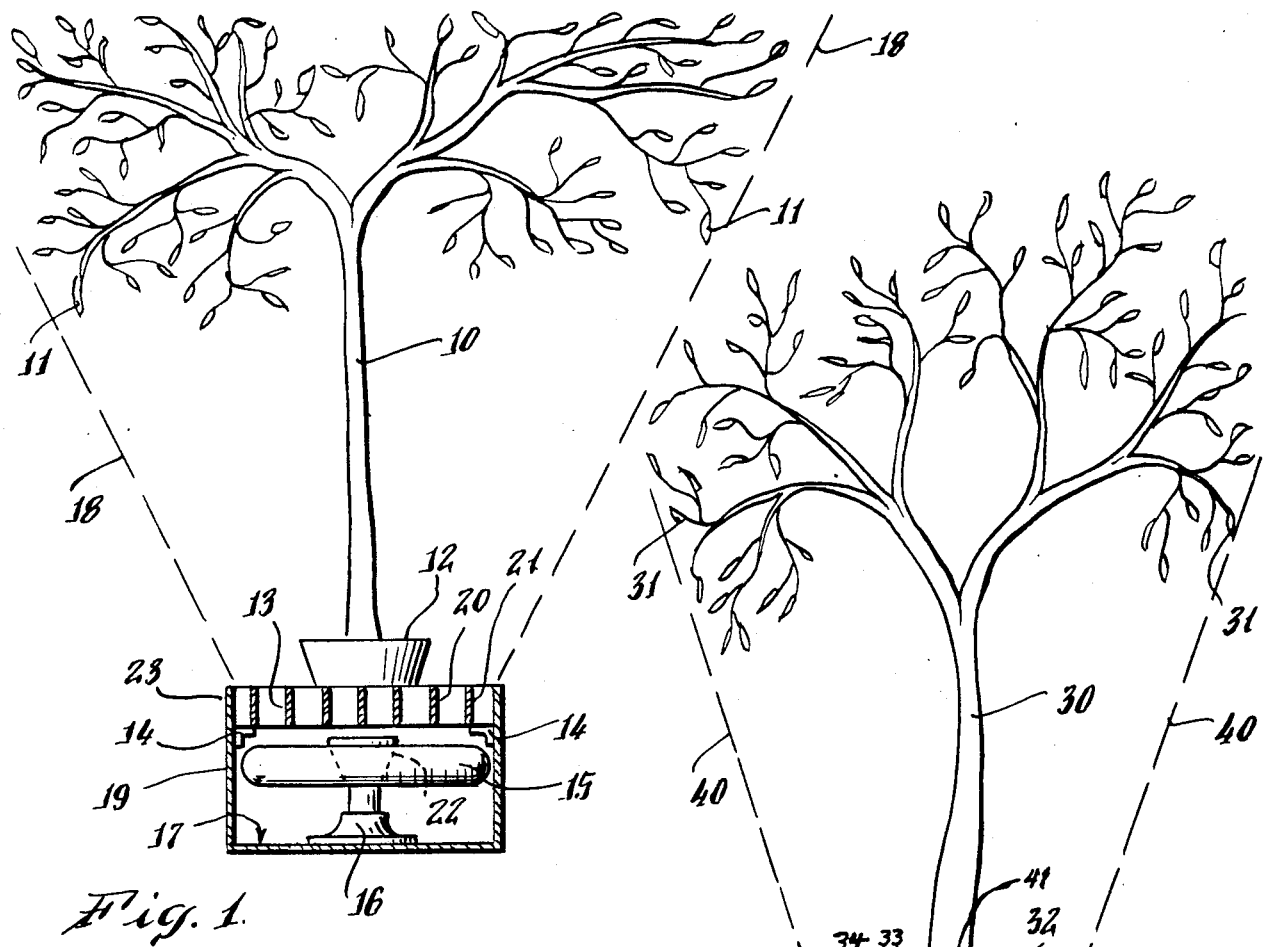
Fig. 1.
Fig. 2.
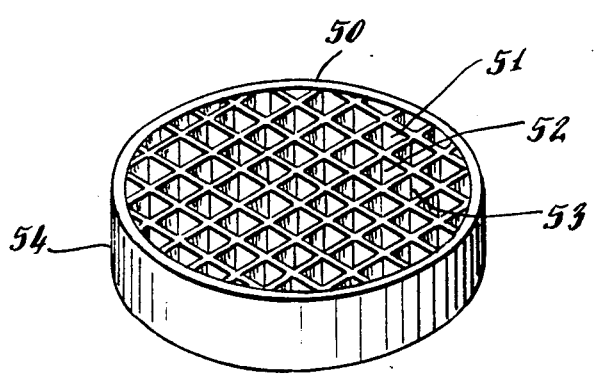
Fig. 3.
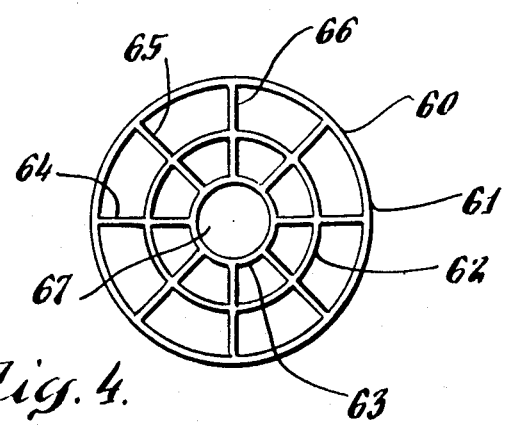
Fig. 4.

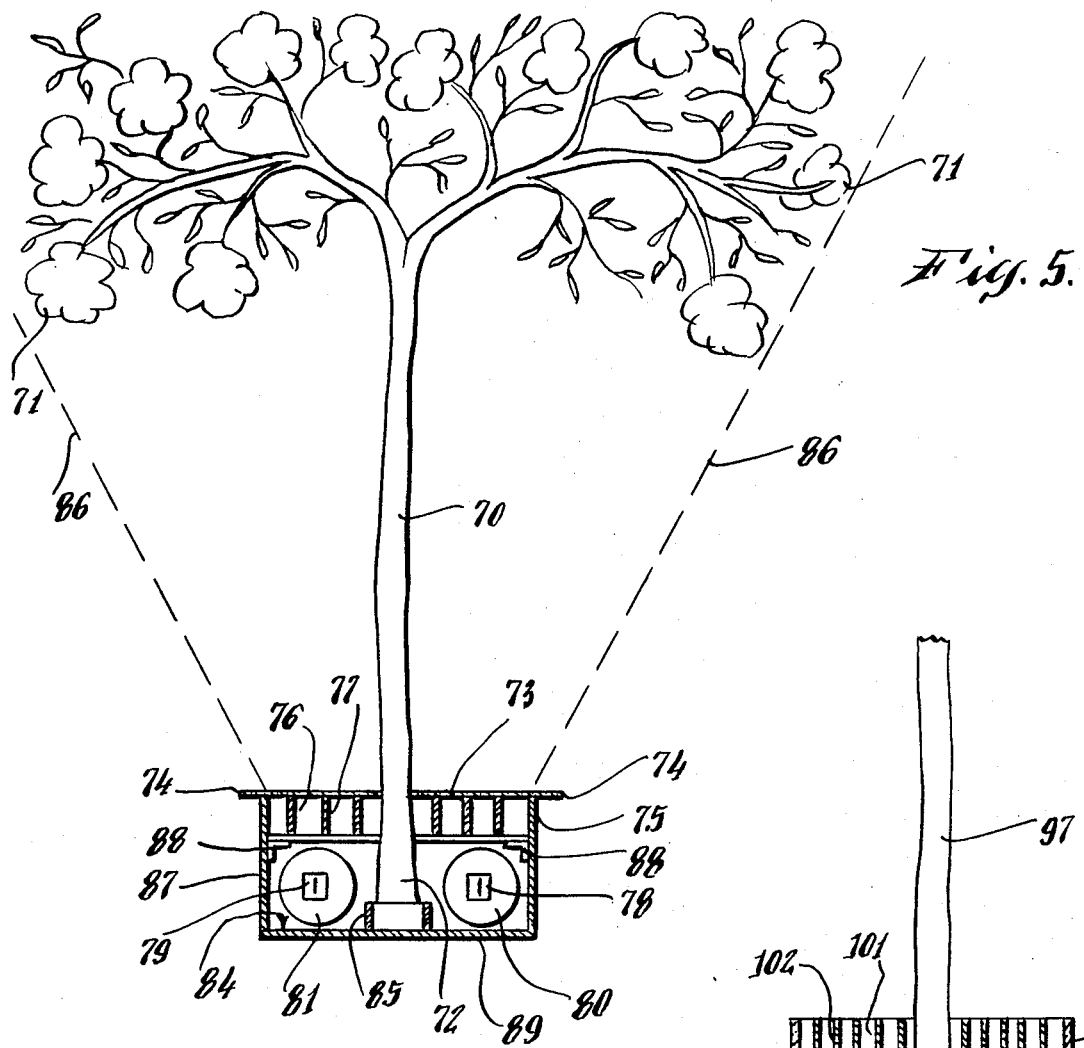
Fig. 5.
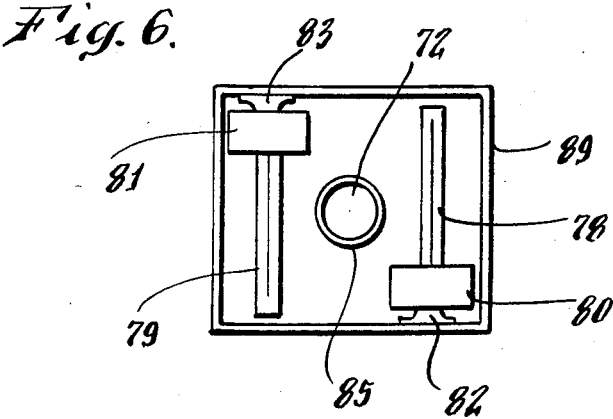
Fig. 6.
Fig. 7.

APPARATUS FOR ILLUMINATING CENTRIPETALLY VIEWED THREE-DIMENSIONAL OBJECTS

This application is a continuation-in-part of application Ser. No. 697,168, dated 2/1/85 and now U.S. Pat. No. 4,626,968; which is a continuation-in-part of application Ser. No. 660,905, dated 10/15/84, now issued as U.S. Pat. No. 4,594,646 and is a continuation-in-part of Application Ser. No. 733,936, dated 5/14/85 and now U.S. Pat. No. 4,616,304.

BACKGROUND OF THE INVENTION

The present invention relates to the directional lighting of objects having three-dimensional surfaces, such as plants, sculptures and other defined objects.

It particularly relates to the penetrating, yet glare-free illumination of objects intended to be centripetally viewed by a plurality of observers encircling such lighted object.

Conventional methods used to light three-dimensional objects involve the use of spotlights, ceiling lights, track lights and the like, normally beamed at and around the object to be illuminated from a distance, normally of several meters. Such lighting methods and devices have a number of disadvantages.

A primary disadvantage stems from the distance at which conventional lights are mounted from the object to be illuminated. This causes not only loss of lumens, but a scattering of light beyond the confines of the object. It is obvious that, the greater the distance, the more difficult it is to economically direct light with precision at three-dimensional objects, especially objects having irregular configurations. An illustration would be a tall or spindly plant or an irregularly shaped object, in the lighting of which much of the light passes by and through such an object.

A serious drawback of such lighting methods lies in the glare produced by ceiling lights and spotlights, which results in discomfort to the eyes of observers.

Glare-free lighting devices positioned in close proximity to the objects to be illuminated are known and employed in the conventional lighting of two-dimensional surfaces such as paintings, murals, wall hangings and the like. Such devices, mounted for instance at the top or bottom edge of a painting, are however not suitable for lighting objects having three-dimensional surfaces, such as standing or hanging indoor plants, or outdoor plants, in a decorative, pleasing and effective manner. The present invention is specifically directed towards the illumination of objects having three-dimensional surfaces and does not relate to the lighting of two-dimensional, planar, or essentially flat areas, such as floors and walls, or other flat objects such as paintings and tapestries.

Lighting devices, such as spotlights, for lighting indoor and outdoor plants are used extensively in the illumination of specific three-dimensional objects. The light from such light sources, illuminating for instance the foliage of plants, normally emanates from one source or from several discrete light sources placed at a distance from the object. The disadvantages of these devices are several. First, the light originating at a single source or even at several sources, positioned at a distance and directed at a plant, illuminates only that facet of the foliage which faces such light sources, i.e. one side of the plant. Also, such light usually shines across and through the plant, which is inefficient; more importantly, the naked light shines directly into the eyes of persons facing the light source. If the illuminated plant is thick or dense enough to prevent light from shining through it in such annoying fashion, it follows that the side of the plant facing away from the light source receives no illumination at all. If, in order to overcome these drawbacks, several light sources are disposed around the object to be illuminated, the equipment cost and operating expenses are correspondingly multiplied. Furthermore, the lighting effect of such devices is not uniform and juxtapositioned persons will be exposed to glare.

The present invention therefore is intended to be useful in lighting three-dimensional objects involving multi-directional and centripetal (radially inward) viewing by juxtapositioned observers on opposite sides of the object to be illuminated, irrespective of whether the lighted object is transparent, has openings, or is irregularly shaped. Using currently available devices, the pleasing effect of lighting the foliage of plants and shrubs is destroyed when the human eye is directly exposed to the light source.

The type of outdoor lighting device commonly used, which has reflectors directing light downwardly in a glare-free manner towards the ground is capable of illuminating only flowers or short plants; whereas the present invention does not depend on the height, shape or level of the object to be illuminated. In fact, the devices described herein are particularly effective in lighting trees.

Known lighting devices are unsatisfactory when objects are displayed for viewing from all sides, e.g. free standing museum exhibits. The present invention addresses problems of this nature, as for instance lighting a sculpture in such fashion that observers grouped in a circle around the exhibit will each have an unobstructed, glare-free view of the uniformly lighted sculpture, or even of a sculpture having selected individual features lighted differently from the rest.

It therefore is a principal object of the invention to directionally illuminate three-dimensional objects, such as plants and sculptures in such a manner that the source of light is not directly visible and glare is avoided.

It is another principal object to illuminate plants in a penetrating manner, while completely engulfing the outer reaches of such plants.

It is another object to minimize the loss and consumption of lumens by placing the light source in close proximity to the object to be illuminated so as to shorten to the absolute practical minimum the path the light has to travel in illuminating the object.

It is still another object of the invention to avoid the scattering of light inherent in other lighting methods.

It is another object to provide an apparatus of minimum height and width, capable of illuminating widely spreading plants.

It is yet another object to provide an illuminating system and luminaire which are economical and simple to manufacture, install and maintain, and which are highly efficient in operation. It is still another object to indirectly light three-dimensional objects in a novel, decorative and pleasing manner.

DEFINITIONS

As stated, the avoidance of glare is a primary object and result of the systems and devices described herein.

The Encyclopaedia Brittannica published in 1956 defines glare as follows:

"When brightness becomes irritating it is recognized as "glare." Glare contributes more to the poor quality of a lighting system than any other factor. Glare may depend upon several conditions present in the lighting system: (1) high brightness of the source; (2) high brightness contrast between the source and the background; (3) location of the source in the field of view; (4) the total volume of the light entering the eye; and (5) the time of exposure to the brightness source. The correction of any of these contributing factors becomes simple when it is considered individually. Because of the injurious effect of glare, either direct as from a source, or reflected from some object which reflects a specular image, bare lamps exposed in any plane should never be used. It is of prime importance that all forms of glare be controlled properly."

The term "source of light" as used herein is intended to include where appropriate a combination of more than one lamp positioned at a lighting hub or arranged in such manner as to function as central light source. The term "light cone" is intended to include light beams or other upwardly diverging or spreading light rays, whether of circular, oval, rectangular or other configuration. The term "object" in the phrase "object to be illuminated" is intended to include, where appropriate, the holder or support for trees, sculptures, or associated elements of such objects as for instance the flower pot of a plant. The term "reflective" as used hereinafter is defined as "light-reflective". The term "bowl-shaped" or "dished" is intended to refer to concave structures, such as vessels having an approximately parabolic, elipsoid or hemispheric configuration at their bottom, irrespective of the configuration of the rest of the wall surface between the bottom and the rim of the vessel. The term "plant" is intended to include flowers, trees, branches thereof, and the like, both natural and artificial or dried.

The various objects and advantages of the invention will become apparent from the following description and accompanying drawings. While the description and drawings are for illustrative purposes primarily directed to plants and trees, it should be obvious that the devices and systems claimed are equally suitable for and applicable in the illumination of other objects, such as sculptures, antiques, statues, art objects, mineral exhibits, theatrical devices, stage props, museum and show pieces of any nature.

SUMMARY OF THE INVENTION

The present invention may be summarized as being directed to devices and systems for the substantially glare-free, directional lighting of three-dimensional objects, by which artificial light is generated at a central point which is recessed, disposed below and proximate to the object to be illuminated. Some of the generated light shines directly upwardly. It is augmented by light shining downwardly, which is reflected upwardly towards said object in the shape of a predetermined light cone or beam striking the underside of and substantially enveloping the object without significant scattering of light. Shielding means in the form of a compartmentalized grille are provided above the light source and protect the eyes of observers from direct view of the light. The upwardly directed light is centripetally and indirectly visible essentially only by its reflections from the illuminated object. It is a principal characteristic of the devices described herein, that the lower portion of the object to be illuminated rests directly on or is horizontally surrounded by a light shielding grille mounted proximate to and above the light source. The novel spatial arrangement of components according to the present invention thus permits lighting large surface areas of bulky, three-dimensional objects in a penetrating manner, while permitting centripetal viewing, including particularly the glare-free viewing by a plurality of juxtapositioned observers, for instance persons grouped around the illuminated object in a circle, irrespective of the level of the light source relative to the eyes of observers. In another embodiment of the apparatus, a light-conducting member adapted to be a tree holder is provided between the light chamber and the grille. The lighting devices of the present invention drastically reduce electric power requirements by reducing the distance between the light source and the objects to be illuminated to the practical minimum. The light source is disposed proximate to said object and the light passes only through said light-shielding grille to reach the object. This arrangement reduces the light path in many instances to substantially less then 30 centimeters. In most cases, the light will travel no more than 10-15 centimeters to reach the lower end of the object. This arrangement significantly reduces the height of the device. In addition, because the light spreads upwardly, the horizontal dimensions of the device itself are reduced to a minimum.

The devices described are particularly suitable for the lighting of such objects as natural and artificial plants, and other free-standing objects. In the case of natural plants, means for the protection of the light source against water are provided.

BRIEF DESCRIPTION OF DRAWINGS

FIG. 1 is a diagramatic cross-section of the apparatus supporting a planter.

FIG. 2 is a diagramatic cross-section of the apparatus incorporating a different plant support.

FIG. 3 is a view in perspective of a compartmentalized, circular grille employed in the apparatus.

FIG. 4 is a diagramatic cross-sectional plan view of another version of the compartmentalized grille employed in the apparatus.

FIG. 5 is a diagramatic cross-section of the apparatus embodying different light sources and yet another form of plant support.

FIG. 6 is a diagramatic, cross-sectional plan view of a rectangular version of light chamber employed in the apparatus.

FIG. 7 is a diagramatic cross-section of the apparatus having a light-conductive tree holder.

DETAILED DESCRIPTION OF THE INVENTION AND DRAWINGS

The apparatus shown in FIG. 1 in diagramatic cross-section is intended to illuminate plant 10 supported or grown in member 12. Member 12 may be a planter or, in the case of artificial trees, may be an anchor, such as a plaster or cement block, into which the tree trunk has been inserted. Plant support 12 removably rests on grille or louver 13 formed by vertical peripheral wall 23 and vertical compartment walls, such as walls 20 and 21. Plant 10 may therefore be shifted on grille 13 so as to obtain the desired lighting effect. Grille 13 is supported directly above light source 15, shown as a circular fluorescent lamp having a starter and ballast 22 built into the lamp unit. Lamp 15 is supported by lampholder 16 which is mounted on the bottom of container or light chamber 19. Appropriate electric connections (not shown) are provided. In the embodiment of FIG. 1, grille 13 rests on brackets 14 attached to the inside of light chamber 19.

Plant 10 has foliage 11, the outer reaches of which are illuminated by a light cone defined by dotted lines 18. The angle of upward divergence of the light rays generated by lamp 15 is determined by the plan view cross-section and the height of the compartments forming grille 13. The light generated by lamp 15 shines both upward and downward. Downward light is re-directed upwardly by reflective surface 17 on the bottom of light chamber 19. The combined light thus forms a light cone, the rays of which strike and deeply penetrate into the underside of the foliage and engulf the outer reaches 11 of plant 10.

Louver or grille 13 is open at the top and bottom. Warm air can escape from light chamber 19, even though relatively little heat is generated by fluorescent lamp 15. Suitably screened fresh air vents may be provided near the bottom of light chamber 19.

As will be seen, the elements comprising the apparatus are relatively few, economical and easy to install and maintain. The apparatus is small and the light path is short and direct. Yet, the light from lamp 15 is not directly visible to any observers positioned outside the light cone 18. The surfaces of the vertical walls 20, 21 and so forth, are dark-colored and substantially non-reflective. As a result, observers see neither the light source, nor light reflections off the surfaces of the apparatus. The only light they see are the reflections off the surfaces of the illuminated object, in this instance the plant foliage. Grille 13 extends horizontally around the lower portion or bottom end of plant 10, even though plant 10 may terminate above the level of grille 13.

Suprising results are obtained, if the walls of grille 13 are slightly wedge-shaped, such grilles sometimes being referred to in the trade as "para-wedge" grilles. These grilles often comprise slightly concave or "parabolic" surfaces on the inner compartment surfaces. Good light shielding effects are obtained by providing specular, or mirror-like finishes on the concave wall surfaces, giving the appearance of dark surfaces. In order of effectiveness of glare suppression, dark-colored grille compartment walls displayed the greatest efficacy; they were followed by silver or chrome finishes, and finally by gold surfaces. Good results were obtained with compartments forming one inch cubes. The apparatus shown in FIG. 2 illuminates tree 30, including the outer limits of the foliage 31. Light cone 40 does not diverge as much as that shown in FIG. 1, its angle being determined by the configuration of the compartments forming grille 35. The plan view cross-section of the compartments of grille 35 is similar relative to their height than that shown in FIG. 1, so that the light generated by lamp 37 in light chamber 42 does not spread to the extend of the light cone of FIG. 1. Lamp 37 is supported by lampholder 38 mounted on the reflective bottom surface 39 of chamber 42 and incorporates starter and ballast 43. The corners of chamber 42 are rounded. The light chamber may also be bowl-shaped or dished. Grille 35, which is attached to or removably rests on support means 36, is provided with a center opening which may contain a sleeve, accomodating the lower end 41 of tree 30, which rests on support means 36. Support means 36 may comprise any structure that does not significantly impede the upward passage of light, such as cross-bars of other means in, attached to, or mounted on the wall of light chamber 42 by any known fastening or support means. Said support means may comprise legs resting on the bottom of chamber 4. The vertical compartment walls 33, 34 and so forth, are provided with a dark, substantially non-reflective surface. When the object is exposed to rain or other water, a transparent ring 32 may be placed on grille 35, preventing water from falling on the light source without impeding upward passage of light. In a modified version of the device, support means 36 may comprise a transparent member, such as an acrylic disk, on which tree trunk 41 rests. Chamber 42 may have any suitable configuration, including a dished bottom. The inner walls of light chamber 42 may be reflective, or a separate dished reflector may be provided between the bottom of chamber 42 and lampholder 38.

FIG. 3 depicts one embodiment of compartmentalized grille 50, having cells or compartments 51, 52, 53 and so forth. The peripheral wall 54 may be provided, but is not necessary. Grille 50 may be made of any suitable material which is self-supporting, such as thin metal or plastic. Grille 50 has a cross-section approximately corresponding to that of the accompanying light chamber. The compartments 51, 52, 53 and so forth have substantially non-reflective walls, which may be achieved by providing a dark-colored coating on the compartment walls, or by using a dark or non-reflective material in the manufacture of the grille. The grille shown in FIG. 3 has approximately cube-shaped compartments, but other cell configurations may be used.

A different version of the light-shielding means employed in all of the illuminating devices is shown in FIG. 4, depicting circular grille 60 formed by vertical bands 61, 62 and 63, which have different circumferences. They are disposed concentrically, spaced from each other and forming center opening 67. Radially extending walls 64, 65, 66 and so forth, connect and subdivide the annular compartments formed by bands or walls 61, 62 and 63. The height of said walls in relation to the cross-sections of the compartments formed determines the angles and dimension of the light cone projected by the light source through said grille. The walls of grille 60 are dark-colored or otherwise made non-reflective, so that light passing through said grille is substantially invisible to observers encircling the apparatus. Center hole 67 has dimensions to accommodate a flower pot, tree trunk or the base of sculpture. When desirable, center hole 67 may have a bottom closure or support for such object.

FIG. 5 is a diagramatic cross-section of an apparatus having a different light source, tree support and grille support. Lower end 72 of the artificial tree 70 is supported on the bottom of lamp housing or light chamber 89. A sleeve support 85 is shown, but any other anchoring device may be employed. Two horizontally mounted fluorescent lamps 78 and 79, having starters and ballasts 80 and 81 respectively, and held by lampholders 82 and 83, provide light on essentially all sides of tree 70. A larger plurality of light sources may be provided below the object in the form of a central light hub. Light chamber 86 may be circular or rectangular in plan view cross-section, but may other configurations. Grille 75 is of the types described and is supported in any suitable fashion, for instance by brackets 88. Side wall 87 of light chamber 89 may terminate at the height of brackets 88 or may further extend vertically, so as to enclose grille 75. The dimensions of dark-colored compartment walls 76, 77 and so forth, determine the angles of the light cone 86, intended to engulf the outer reaches 71 of tree 70.

When illuminating a natural tree or other object exposed to water, a ring-shaped, acrylic plate 73 with a center opening may be placed on grille 75. Sleeve 85 is replaced by a planter or other support. Rain and other water runs off the overlapping edge 74 of plate 73 along its periphery, or through the center hole into the planter. Additional water guards may be provided above the light sources. The inner surface 84 of housing 89 is made reflective. A plurality of different grilles may be interchangeable and have a variety of compartment sizes to fit the size of the tree or other object to be illuminated.

In another application of the invention, the object is illuminated in a selected color or colors other than that of the light source. For instance, a transparent plate or sheet may be provided between the light source and the object. It may be annular when required, and consists of a translucent, plastic film of desired color or colors. The film rests on the rim or on the wall of the grille and acts as a filter for the light directed upwardly towards the object.

According to another embodiment of the invention, the dished bottom of the light chamber serves as a reflector and is shaped similarly to certain cake forms, sometimes referred to as "angel cake pans" or "bundt cake pans" having an annular depression or cavity around a central opening or protrusion. The light source is mounted in the center of and above such reflector. It should be clear, however, that in all embodiments of the present invention, the light source is mounted proximate to the object to be lighted.

FIG. 6 is a diagramatic plan view cross-section of light chamber 89, having a square configuration. Fluorescent lamps 78 and 79 having ballasts and starters 80 and 81 respectively and being held in place by lampholders 82 and 83, occupy very little vertical space. Tree trunk 72 is anchored in sleeve support 85, or by other positioning means. The vertical dimension of these support means does not exceed that of the light source. In practice, therefore, the total vertical space taken up by this arrangement is 10–15 centimeters or less, from the bottom of light chamber 89 to the top of the grille described above. It will be obvious from the foregoing that the miniaturization of the devices claimed is an important result of the designs shown. Their spatial arrangements produce the most compact lighting device possible and reduce the light paths to the absolute minimum. Furthermore, the concentration of the generated light in a light cone corresponding to the outer limits of the object, avoids scattering and waste of light. As a result, the lamp size and power consumption are reduced significantly compared to spotlights, ceiling and tracklights.

If the object to be illuminated does not spread widely in a horizontal direction, the spread of the light beam may be further restricted by providing vertical walls on the light chamber which protrude vertically above those of the grille. On the other hand, widely spreading or very bushy plants, which ordinarily would require several spotlights positioned at different angles with attendant glare, can be lighted in a most attractive and glare-free manner by a single central light source arranged as hereinbefore described. If more powerful lamps are used, the light reflected by the illuminated object can even produce an intimate lighting effect throughout the ambient space without requiring additional room lighting and without glare. Thus, the devices described herein may be used as night lights or to provide subdued illumination when this is desirable in homes and in public places.

The apparatus shown in diagramatic cross-section in FIG. 7 has a light chamber 90 of the type previously described, having walls 99, which are light-impervious or provided with a light-shielding cover. Upwardly reflective bowl 91 and/or reflective bottom surface 92 reflect light generated by lamp 94 upwardly through the open upper side of light chamber 90. Fluorescent lamp 94 is held by lampholder 93 and supplied with 120 volt current through electric connections (not shown). Any other type of electric lamp may be used. Suitable light-shielded air vents are provided in light chamber 90 if required, such as vents near its bottom, the reflector 91 serving to prevent a view of the light from the outside. Tree 97 is supported and held in place by member 95 having cavity 96 at or near its center. Member 95 comprises a transparent, light-conductive material, such as glass or acrylic plastic. It is provided with a light-impervious or light-shielding coating on its peripheral surfaces 100. Cavity 96 is sufficiently deep to hold the lower end of tree 97 in place. Tree 97 may further be firmly secured in the tree holding member 95 by set screws 98 or other fastening devices. Cavity 96 does not fully extend through member 95, so that tree 97 rests on the bottom of cavity 96; alternatively, cavity 96 passes completely through member 95 and tree 97 is supported by a bottom closure on member 95. Member 95 extends horizontally at least to walls 99 of the light chamber 90 and extends under the foliage of tree 97. Thus, the dimensions of light-conductive member 95 are determined vertically by the depth of cavity 96 required to hold tree 97 in place and, horizontally by the light beam required to illuminate the foliage of tree 97.

Grille or louver 101 rests on member 95 and extends horizontally at least to the outer walls 100 of member 95. Grille 101 is of the types previously described, having a peripheral wall 103 and compartment walls, such as wall 102, which preferably are slightly wedge-shaped or paraboloid. Member 95 and grille 101 may be made in one piece, for instance by the injection molding of acrylic. This embodiment has the advantage of being able to utilize the grille portion of the combined elements as an additional means to hold tree 97 in place, thus permitting a reduction in the depth of cavity 96.

When illuminating trees or plants, the walls of the grille compartments may be given a more natural appearance by painting or covering them with material simulating grass or moss in texture and color. Artificial moss may also be placed on the grille in the form of a thin transparent layer.

If heat is generated by the light source and is to be dissipated, a number of vertical perforations, serving as warm air vents, are provided in member 95. Fresh air vents are provided near the bottom of light chamber 90. In order to prevent light from being visible through such vents, the outer surface of reflector 91 is painted black.

According to a preferred embodiment of the invention, the height of the grille compartment walls exceeds their horizontal dimensions by approximately one half or more. As an example, a grille is formed by aluminum walls having a thickness of 0.025 inches. The horizontal cross-section of the compartments is $\frac{1}{2}'' \times \frac{1}{2}''$ and their height, i.e. vertical dimension, is 1½". A black grille having the aforementioned configuration, 12" in diameter and having a 50 Watt lamp positioned below it, produced excellent lighting effects on a tree 4 feet tall, having a foliage spread at its top of 30". Observers standing around such a tree in a circle at a distance of 6 feet from the tree, are not exposed to irritating glare. In contrast to spotlight illumination, all tree surfaces are lighted uniformly.

Equally superior results were obtained in illuminating a 6 foot tall tree having a 36" upper foliage spread, with a 75 Watt lamp through a 12" diameter grille having compartments with a 1½" square cross-section and a height of 3". It therefore is one of the characteristics of the devices described that height of the grille compartments is greater than their length or width.

The miniaturization of the illuminating devices described permits the illumination of artificial dwarf trees, such as bonzai trees, in a novel and superior manner. As an illustration, a straight tubular fluorescent lamp is mounted horizontally in a rectangular planter, tray or dish normally used for dwarf trees. A grille section having cube-shaped compartments is cut into a shape having the approximate horizontal dimensions of the dwarf tree foliage. In view of the small distance between the grille and the foliage, the compartment dimensions may be relatively small, such as one centimeter or one half inch cube. Fluorescent lamps with 7–9 Watt output are sufficient to illuminate a bonzai tree. Suitable positioning means for the tree trunk are provided, such as a cup or sleeve in the bottom of the planter or tray. An appropriate hole is provided in the grill, through which the tree trunk passes. The grille itself can serve as the sole means of positioning the tree, in which case the hole in the grille is provided with a sleeve for the tree trunk which simply rests on the bottom of the planter or tray. Thus, the planter or tray, having light-impervious walls and a reflective bottom, functions as a light chamber of minimal height. The light from one or more lamps is projected upwardly through the grille in the form of a light beam having the approximate configuration of the tree foliage. The short distances make it possible to aim such light beam with precision, thus avoiding scattering of light and minimizing power requirements, while preventing glare.

Incandescent, fluorescent or other types of lamps may be used in practicing the present invention. Included among both types are lamps generating light on natural plant growth promoting wave length.

In another embodiment of the invention, a light sensor is provided between the power source and the lamp, adapted to activate the light source at dusk and de-activate it at dawn. Devices having an appropriate timer, wherein the lamp aids natural plant growth, can provide such radiant energy to the plant at predetermined times in the absence of the occupants of the premises.

When the device described in some of its embodiments is used in places where it would be impractical or ungainly to string electric cables to an outside power source, battery-powered light sources may be substituted for those supplied by an electric utility.

Application Ser. No. 660,905, now issued as U.S. Pat. No. 4,594,646, describes devices in which light is generated below the object to be illuminated and is upwardly reflected in the form of a light mantle. The present invention pertains to devices projecting more penetrating light in the form of an inverted light cone. Such a light cone is capable of illuminating larger surface areas of objects than are illuminated by the smaller amount of light escaping from the earlier device as a light mantle. Yet, the devices and systems of the present invention fully achieve a principal object common to both inventions, viz. the virtually complete suppression of irritating and distracting glare. While light diffusers and light shields are well known and widely used in ceiling lights and other fixtures, the novel combination and spatial relationship of the components comprising the devices described herein, produce results not presently achieved.

These results include
more penetrating light effects, particularly in the case of plants, where the light penetrates into the entire underside of the plant foliage, as well as engulfing its outer reaches;
obviating the horizontal extension of the device below the outer reaches of the object;
minimizing scattering and waste of light;
reducing the light path from the light source to the lower end of the object to approximately 10–15 centimeters;
avoiding a direct view of the light source and glare to observers positioned around the illuminated object.

The following example further illustrates the novel use of a grille in the glare-free miniaturized devices described, in this instance in connection with a table, such as a dining table, having a flower arrangement as its centerpiece. In this embodiment, a removable raised structure is placed on such table. The structure includes the light chamber having the required dimensions, and a grille. An opening is provided in and near the center of the upper surface of the raised structure. Said opening is large enough to accommodate a device of the type described. The device is inserted in said hole and supported in recessed position in a hanging manner or resting on the bottom wall of the box or directly on the table. The wall and rim of the flower pot supported by said device, or only the flowers, protrude upwardly through said opening above the surface of the raised structure. The small dimensions of the devices described, make them particularly suitable for this application.

Electric connecting means from the source of power supply to the device are disposed and concealed below the upper surface of the raised structure. When preferred, a battery is provided inside said raised structure or below the table. A switch for the light source may be mounted on the outside of said structure.

Due to the recessed position of the light source and the grille arrangement described, the persons sitting around the table see only the reflections of the indirect light from the flowers and do not see the light emanating from the device directly, even though they may be sitting within 50 centimeters or less of the flowers. This effect may also be achieved by providing the opening for the device directly in the table itself, the device being suspended from or supported by a table member.

When placing the apparatus described at or near ground level, additional light shielding means are provided in order to prevent a direct view of the light source by observers positioned close to it. In such instances, the vertical, peripheral wall of the housing of the light source is made high enough to protrude above the grille and to act as an additional light guard. The said housing may be the light chamber containing the lamp or may be a separate additional receptacle in which the said apparatus is inserted and recessed.

According to yet another embodiment of the invention, the lamp below the object to be illuminated is suspended from above. The light shines and/or is reflected upwardly by the reflector in the bottom of the container. In an example of this embodiment, the treeholder and the lampholder are co-extensive and are joined by a connecting portion around which the grille is disposed. The tree extends upwardly from the upper tree-holding sleeve and the lamp is held by the lampholder facing downwardly towards the reflector.

The advantages of this modified version of the apparatus is that the distance between the lamp and the grille is even further reduced. Furthermore, construction is simplified. The center portion of the grille may be adapted, by strengthening, to serve as the treeholder. The grille and the lampholder, including their support means, such as legs, may be molded or cast in one piece.

Normally, observers are not positioned so close to a plant as to look straight down into a flower pot or other container of the object to be illuminated. The present invention makes it possible to shield from glare the eyes of all observers positioned outside an area above the device approximately defined by the inverted light cone extending upwardly from the device; in practice this includes virtually all persons viewing the illuminated object, even if a group of juxtapositioned observers completely encircles such object, as most will be positioned outside said light cone.

The devices described can be employed in systems which comprise a cavity below ground, or a receptacle above ground, into which the devices are inserted. Above-ground standing or hanging receptacles, such as vases, urns, bowls, chests and the like, may be decorative and completely hide the illuminating device, which can therefore be manufactured of the most economical materials, disregarding their appearance. Appropriate electrical connections are provided in all instances.

In the practice of the present invention, water is present under two circumstances, i.e. in the illumination of natural plants requiring watering, with the attendent danger of overwatering, and of outdoor objects exposed to rain. In these applications, water-proof lighting fixtures and rust-proof components are used. It will therefore readily be appreciated that devices designed for the field of use obviating these requirements, i.e. in the illumination of artificial plants and other indoor objects, are much simpler and cheaper. When the devices described are used in unprotected outdoor locations, the light source and electrical connections are of waterproof construction; reflective surfaces are rust-resisting; and water drainage means are provided for all receptacles or related structures.

Other applications, embodiments and configurations of the present invention may be devised by persons skilled in the art without deviating from the principal features described herein. These and any modifications covered by the doctrine of equivalents are intended to be included within the scope of the appended claims.

What is claimed is:

1. An illuminating apparatus for illuminating a three-dimensional object for substantially glare-free centripetal viewing by observers encircling said object, comprising:

means for supporting said object to be illuminated, said object being disposed essentially above said illuminating apparatus, a grille extending horizontally around a lower portion of said object having spaced vertically extending walls forming a plurality of compartments for permitting vertical passage of light and preventing radial escape of light, an electric light source mounted below and proximate to said grille, an upwardly reflective surface disposed below said light source, a light chamber enclosing said light source and said reflective surface having walls adapted to prevent light from escaping except in an upward direction through said compartments in a direction of said object in the form of an upwardly spreading light cone penetrating an underside and enveloping outer reaches of said object, and said vertically extending walls of said compartment being sufficiently high in relation to their plan view cross section so that said light is substantially not directly visible to observers encircling said object and is indirectly visible to such observers by the reflections of the light from surfaces of said object.

2. The apparatus of claim 1, wherein said compartments are formed by vertical annular bands of different circumferences, spaced from each other and subdivided by radially extending walls.

3. The apparatus of claim 1, wherein said compartments have configurations selected from a group consisting of honeycombs, grilles, grids, gratings, lattices and other cellular shapes.

4. The apparatus of claim 1, having waterproof sheet means disposed above said light source.

5. The apparatus of claim 1, having colored transparent sheet means disposed above said light source.

6. The apparatus of claim 1, having vertical peripheral light shielding means positioned above said grille.

7. The apparatus of claim 1, wherein said light chamber is adapted to support the lower end of said object.

8. The apparatus of claim 1, wherein said compartment walls are dark-colored.

9. The apparatus of claim 1, wherein said compartment walls have a wedge-shaped cross section.

10. The apparatus of claim 1, wherein said compartment walls are slightly paraboloidal.

11. The apparatus of claim 1, wherein said grille is provided with a central opening as an additional positioning means for said object.

12. An artificial tree holding and illuminating apparatus comprising.

a grille having spaced, vertically extending walls with a substantially centrally located cavity therein, said cavity adapted to receive a trunk of the tree which is to be supported and illuminated by said apparatus, a plurality of compartments formed around said centrally located cavity by said vertically extending walls of said grille extending horizontally under foliage of the tree positioned in said cavity, a light chamber for supporting said grille and said tree directly above said light chamber, a light transparent member disposed between said light chamber and said grille, a light source mounted in said light chamber, a light shielding peripheral wall forming said light chamber surrounding said light source and a reflecting surface positioned below said light source for directing light from said source upwardly through said light transparent member and through said compartments for illuminating the tree positioned in said cavity of said grille while preventing an observer from directly viewing said cavity in said light transparent member and supported in said apparatus by said light transparent member.

13. The apparatus as claimed in claim 12, wherein said light transparent member has a central opening in alignment with said cavity and said tree trunk extends through said opening into said light chamber and is supported thereby and said light source is positioned on the side of said trunk in said light chamber.

14. The apparatus as claimed in claim 12, wherein said light transparent member has a central cavity therein aligned with said centrally located cavity in said grille and said tree trunk is positioned in said cavity in said light transparent member and supported in said apparatus by said light transparent member.

15. The apparatus of claim 12, wherein said compartments are formed by vertical annular bands of different circumferences, spaced from each other and subdivided by radially extending walls.

16. The apparatus of claim 12, wherein said compartments have configurations selected from the group consisting of honeycombs, grilles, grids, gratings, lattices and other cellular shapes.

17. The apparatus of claim 12, comprising colored transparent sheet means disposed above said light source.

18. The apparatus of claim 12, having vertical peripheral light shielding means protrude above said grille.

19. The apparatus of claim 12, wherein said compartment walls are dark-colored.

20. The apparatus of claim 12, where said compartment walls have a wedge-shaped cross section.

21. The apparatus of claim 12, wherein said compartment walls are slightly paraboloidal.

22. The apparatus of claim 12, having waterproof sheet means disposed above said light source.

23. Apparatus for glare-free electric illumination of centripetally viewed three-dimensional objects in wet locations, comprising:
    a light chamber having a bottom and light-shielding walls having upper rims, said light chamber being adapted to contain a light source and to permit light to escape in an upward direction,
    a waterproof, transparent sheet disposed horizontally above said light chamber permitting vertical passage of light,
    said transparent sheet having light-shielding overlapping edges extending beyond said wall rims,
    a grille disposed horizontally above said light chamber, having spaced, vertically extending walls forming a plurality of compartments configured so as to prevent radial escape of light, but permitting the vertical passage of light in the form of an upwardly spreading light cone striking an underside and enveloping outer reaches of said object extending above said grille,
    a light-reflective surface provided in said light chamber,
    an electric light source disposed in said light chamber, and
    waterproof means for conducting electricity to said light source,
    wherein said upwardly spreading light is substantially not directly visible to observers grouped around such object and is indirectly visible to such observers by the reflections of the light from surfaces of said objects, and
    wherein water falling on said objects flows on said transparent sheet to and beyond said overlapping edges
    so as to protect said light source from said water.

24. The apparatus as claimed in claim 23, wherein said compartments are formed by vertical annular bands of different circumferences, spaced from each other and subdivided by radially extending walls.

25. The apparatus as claimed in claim 23, wherein said compartments have configurations of the group comprising honeycombs, grilles, grids, gratings, lattices and other cellular shapes.

26. The apparatus as claimed in claim 23, having vertical peripheral light shielding means protruding above said grille.

27. The apparatus as claimed in claim 23, wherein said light chamber is adapted to support the lower end of said object.

28. The apparatus as claimed in claim 23, wherein said compartment walls have a wedge-shaped cross section.

29. The apparatus as claimed in claim 23, wherein said compartment walls are slightly paraboloidal.

* * * * *